July 8, 1952 W. L. GAINES 2,602,890

SWEEP CIRCUIT

Filed Nov. 1, 1947

INVENTOR
W. L. GAINES
BY Hugh S. Wertz
ATTORNEY

Patented July 8, 1952 2,602,890

UNITED STATES PATENT OFFICE 2,602,890

SWEEP CIRCUIT

Wilbur L. Gaines, Bayside, N. Y., assignor to Bell Telephone Laboratories, Incorporated, New York, N. Y., a corporation of New York Application November 1, 1947, Serial No. 783,529

5 Claims. (Cl. 250—27)

Figure 1:
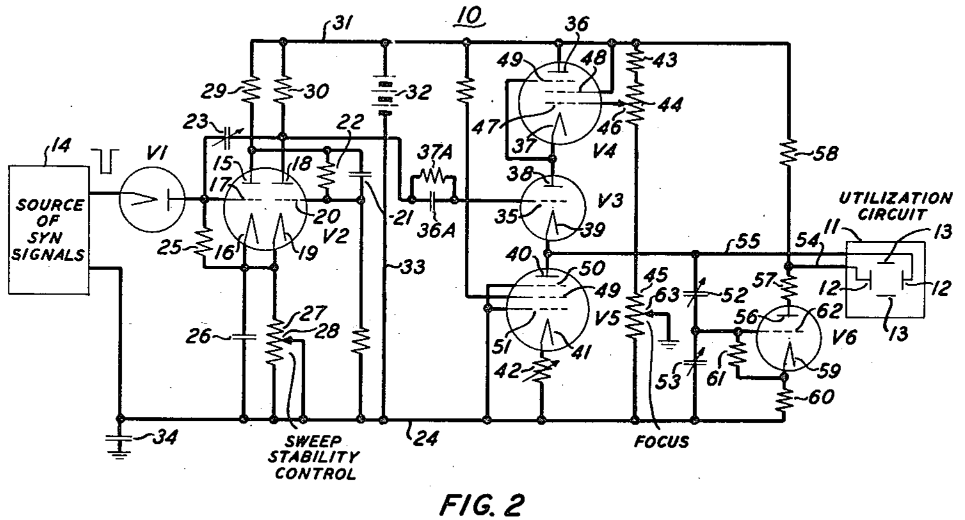

This invention relates to electric circuits employing electron discharge devices and more specifically, but not necessarily, to sweep circuits.

An object of this invention is to utilize an electron discharge device as an adjustable element in a variable voltage, low impedance source of potential suitable for sweep circuits.

It is another object of this invention to provide a sweep circuit which has an adjustable direct current component in the output voltage thereof.

Electrostatic sweep circuits are customarily coupled to the deflecting plates of a cathode-ray tube by means of coupling condensers or transformers. Frequently it is desirable to dispense with such coupling elements and provide a direct connection between the sweep circuit or sweep amplifier and the deflecting element of the tube. Such direct connection with a sweep circuit which produces an output wave having a constant direct current component makes it impossible to change the static position of the cathode-ray beam for biasing purposes. The present invention, in one of its aspects, relates to a sweep circuit which produces an output voltage wave which has an adjustable direct current component so that the static position of the cathode-ray beam can be varied even though the circuit does not employ coupling condensers or transformers.

In accordance with an illustrative embodiment of the invention, there is provided a sweep circuit which is adapted to be directly coupled to one of a pair of deflecting plates of a cathode-ray tube, a phase inverting circuit being utilized to couple the circuit to the other plate of the pair. The sweep circuit includes a sweep condenser, a charging circuit for this condenser including the serially connected anode-cathode paths of two space current devices and a source of direct potential, and a discharging circuit for the condenser comprising a pentode tube acting as a constant current device. One of the space current devices has its anode directly connected to the positive terminal of the source, its control element connected to a fixed (but adjustable) source of direct potential, and its cathode connected to the anode of the second space current device. This latter device has its control element connected to a circuit generating a negative pulse of predetermined length and its cathode connected to one terminal of the sweep condenser, the other terminal of which is connected to the negative terminal of the source. Because the first space current device is connected as a cathode follower, the output impedance thereof (which includes the rest of the charging circuit) is low and the cathode voltage tends to remain substantially constant with changes in anode current. If the potential drop across this first device is varied by changing the control element voltage, there is provided a low impedance variable-potential source of charging potential for the sweep circuit. Varying the grid voltage of the first space current device thus varies the horizontal centering of the spot on the screen of the cathode-ray tube if the sweep circuit is used in an oscilloscope.

The invention will be more readily understood by referring to the following description taken in connection with the accompanying drawings forming a part thereof in which:

Fig. 1 is a circuit diagram of a sweep circuit embodying the invention; and

Figure 2:
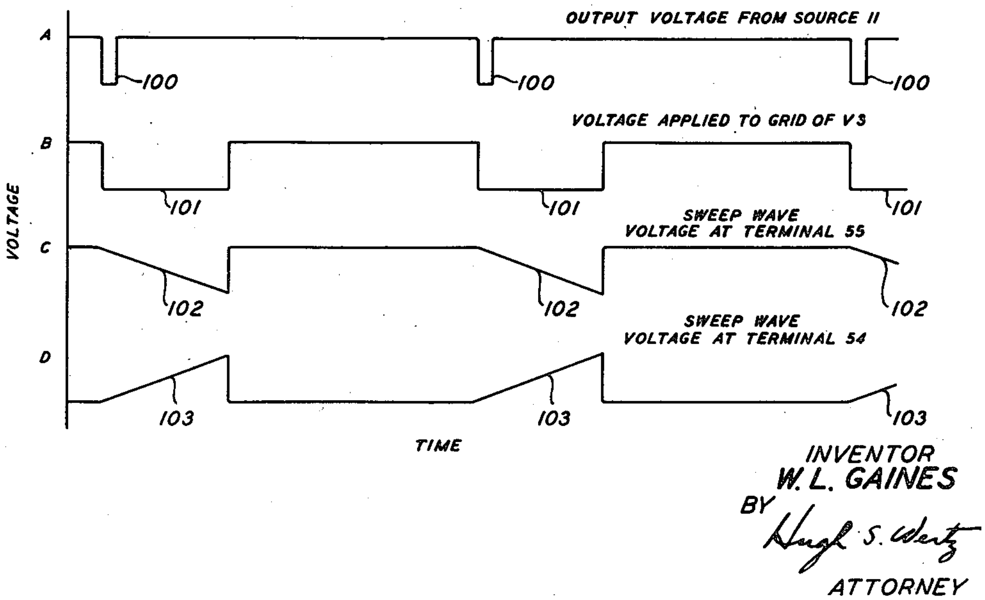

Fig. 2 consists of a group of graphical representations to aid in understanding the invention.

Referring more particularly to the drawing, Fig. 1 shows, by way of example for purposes of illustration, a sweep circuit 10 suitable for application by direct coupling to a utilization circuit 11 which, for example, is a cathode-ray device having two sets of deflecting plates 12 and 13, the sweep circuit 10 being applied directly to the deflecting plates 12, while a signal or other voltage is applied to the pair of deflecting plates 13 arranged in 90-degree relationship to the plates 12.

The circuit 10 is adapted to be actuated by a synchronizing signal supplied by any suitable source 14 which produces negative pulses of the type shown in line A of Fig. 2. These pulses pass through the diode V1 which is correctly poled to pass negative pulses, and are applied to the double triode tube V2 which is connected as a single-trip multivibrator. The tube V2 comprises a first section having an anode 15, a cathode 16, and a control element 17, and a second section including an anode 18, a cathode 19 and a control element 20. The anode 15 is connected through the coupling condenser 21 which is shunted by resistor 22 to the control element 20 while the anode 18 of the second section is connected to the control element of the first section through the condenser 23. The two cathodes are connected to the signal ground terminal 24 of the sweep circuit 10 (which may be above or below true ground by as much as 200 volts depending on the setting of the focus control resistor 45 which will be described below) through a condenser 26 and a resistor 27, the resistance of which may be varied by the sweep stability control tap 28. A grid resistor 25 is connected between the cathode 16 and the control element 17. The anodes 15 and 18 are connected through resistors 29 and 30, respectively, to the positive terminal 31 of the direct current source 32, the negative terminal 33 of which is connected to the signal ground terminal 24. A condenser 34 is connected between the terminal 24 and true ground.

When the negative pulse 100 from the source 14 is applied to the input terminal of the first section of tube V2 this first section is cut off and a positive pulse is applied through the members 21 and 22 to the control element 20 of the second section of the tube V2. This increases the current in the second section, lowering the potential of the anode 18 and thus lowering further the potential of the control element 17 of the first section of V2. Hence the action of the first section of the tube V2 in cutting off its flow of current is expedited. The tube V2 continues to stay in the operated condition (the condition just described—the first section cut off and the second section conducting) for a period of time determined by the size of the condenser 23. With the tube V2 in the operated condition, the plate of the diode V1 is driven negative so that no signal from the synchronizing source 14 will pass to the multivibrator V2 to cause it to unlock (cut off the second section and render the first section conducting). The negative gate pulse 101 (see Fig. 2B) produced at the anode 18 cuts off the valve tube V3 which has been passing current freely in its "unoperated" condition.

The valve tube V3, which has its control element 35 connected to the anode 18 of the tube V2 through a coupling condenser 36A shunted by a resistor 37A, is one of three tubes which have their anode-cathode paths in a series circuit between the positive terminal 31 of the source 32 and the negative terminal 33 thereof. Starting with the positive terminal of the source 31, the series circuit includes the anode 36 of the tube V4, the anode-cathode path of this tube, the cathode 37 of V4, the anode 38 of the tube V3, the anode-cathode path of this tube, the cathode 39 of tube V3, the anode 40 of tube V5, the anode-cathode path of this tube, the cathode 41 of tube V5 and variable resistor 42. Also connected between the terminals 31 and 24 is the potential divider comprising the serially-connected resistors 43, 44 and 45. An inner terminal 46 of the resistor 44 is connected to the control grid 47 of the tube V4 the screen grid 48 of which is connected to the positive terminal 31 of the source 32. Suppressor grid 49 of the tube V4 is connected to the cathode 37 of this tube. By varying the position of the tap 46 on the resistor 44, the current through the tube V4, and thus the current through the series arrangement of tubes V4, V3 and V5, can be controlled.

Tube V5 serves as a constant current device. It has its screen grid 49 connected to the positive terminal 31 of the source 32 while its suppressor and control grids 50 and 51, respectively, are connected to the negative terminal 24 of this source. The capacitors 52 and 53 are connected between the anode 40 and the terminal 24, the tube V5 acting as the discharge path for these condensers which are charged up through the circuit including the soure 32, the anode-cathode path of the tube V4, the anode-cathode path of the tube V3, the capacitors 52 and 53 and the terminal 24 back to the source 32. The sweep control is attained by varying the resistor 42. The capacities 52 and 53 can be varied to control the sweep intensity.

The condenser 53 is connected to the input circuit of the tube V6 which acts as an amplifier and phase inverter and applies by terminal 54 to one sweep plate 12 a wave which is the inverted replica of the wave applied to the other sweep plate 12 by terminal 55 connected to anode 40. Tube V6 has its anode 56 connected through resistors 57 and 58 to the positive terminal 31 of the source 32 while its cathode 59 is connected through resistor 60 to the negative terminal 24 of this source. Grid resistor 61 is connected between the common terminal of the condensers 52 and 53 and cathode 59.

The operation of the circuit shown in Fig. 1 will now be described. In the absence of the synchronizing signal 100 from the source 14, the valve tube V3 is conducting and the sweep condensers 52 and 53 are charged through a circuit including the soure 32, terminal 31, tube V4, tube V3, condensers 52 and 53 in series and terminal 24 which is connected to the source 32. Now, assume that a synchronizing signal 100 is received from the source 14. This pulse appears as a negative change of voltage at the grid 17 of the tube V2 which may be called the gate tube. This tube connected as a single-trip multivibrator operates and continues to stay in an operated condition for a period of time determined by the size of the capacitor 23 connected between the anode 18 and the control element 17 of the tube V2. With this tube in an operated condition, the plate of the diode V1 is driven negative so that no signal from the synchronizing source 14 can pass into the multivibrator to cause it to unlock. The negative gate pulse 101 of the operated multivibrator is used to cut off the valve tube V3. When this latter tube is cut off, the circuit from the source 32 through the tubes V4 and V3 and the sweep condensers 52 and 53 is effectively cut off and condensers 52 and 53 discharge through the tube V5 to the sweep circuit ground connection 24. Because of the constant current characteristic of the pentode V5, this negative change in voltage forms a linear sweep which is applied directly to the right-hand plate 12 of the cathode-ray tube 11. The sweep wave is represented by the reference character 102 in Fig. 3C. By means of the capacitor voltage divider 52, 53 a fraction of the change of voltage across condensers 52 and 53 is applied to the grid 62 of the tube V6 where it is amplified to provide the other half (shown in Fig. 3D as wave 103) of the balanced sweep. A continuously variable sweep decontrol is obtained by changing the cathode bias of the tube V5 by variable resistor 42. Because the sweep plates are directly connected to the sweep generators, it is frequently necessary to vary the average potential of these plates. This can be accomplished by varying the position of the tap 63 on the resistor 45 which tap is connected to true ground. Varying this tap changes the actual potential of the whole power supply. Horizontal positioning or centering is obtained by changing the steady current through tube V4 by varying the position of the tap 46 on the resistor 44 which changes the potential of the horizontal deflecting plates 12 by altering the plate voltage of the valve tube V3.

It will be apparent that various modifications can be made in the embodiment above described without departing from the spirit of the invention the scope of which is indicated in the claims.

What is claimed is:

1. A sweep circuit arrangement comprising a condenser, means for varying the charge on said condenser in one direction comprising a source of potential and two space current devices each of which has an anode, a cathode and a control element, the source, the anode-cathode paths of the two devices, and the said condenser being connected in series, the positive terminal of said source being connected to the anode of the first device, the cathode thereof to the anode of the second device, and the cathode of said second device through said condenser to the negative terminal of said source, means for connecting the control element of said first device to an adjustable source of direct potential, and means for applying control signals to the control element of said second device to vary the impedance thereof between a condition of substantial cut-off and a condition wherein a relatively large amount of current flows therethrough, and means including an impedance element connected across the terminals of said condenser for varying the charge thereon in the opposite direction.

2. A sweep circuit arrangement comprising two condensers in series, means for varying the charge on said condensers in one direction comprising a source of potential and two space current devices each of which has an anode, a cathode and a control element, the source, the anode-cathode paths of the two devices, and the said condensers being connected in series, the positive terminal of said source being connected to the anode of the first device, the cathode thereof to the anode of the second device, and the cathode of said second device through said two condensers in series to the negative terminal of said source, means for connecting the control element of said first device to an adjustable source of direct potential, and means for applying control signals to the control element of said second device to vary the impedance thereof between a condition of subtantial cut-off and a condition wherein a relatively large amount of current flows therethrough, means including an impedance element connected across the terminals of said condenser for varying the charge thereon in the opposite direction, means for applying the voltage variations across both of said condensers in series to a first output terminal, and means for applying the voltage variations across one only of said condensers through a phase inverting amplifying device to a second output terminal, whereby a balanced sweep voltage is attained.

3. In combination, a source of potential, a condenser, a first and a second electron discharge device, each having an anode, a cathode, and a control element, said source, the anode-cathode paths of said two discharge devices and said condenser being connected in series, with the positive terminal of said source being connected to the anode of said first device, the cathode thereof to the anode of said second device and the cathode of said second device through said condenser to the negative terminal of said source, means for varying the voltage applied to the control element of said first device whereby the current through said devices in series is varied and the plate voltage of the second device is correspondingly changed, and means for taking an output voltage from across said condenser.

4. A sweep circuit comprising a sweep condenser, a charging circuit for said sweep condenser including two electron discharge devices each having an anode, a cathode and a control element, a source of potential connected in a series circuit including the anode-cathode paths of said two discharge devices, the positive terminal of said source being connected to the anode of the first device and the cathode thereof to the anode of the second device, and the cathode of said second device through said sweep condenser to the negative terminal of said source, a discharging circuit connected across said condenser, means for applying a negative synchronizing pulse to the control element of the second electron discharge device to block said charging circuit and allow said condenser to discharge, and means for varying the impedance of said first discharge device.

5. A sweep circuit comprising a sweep condenser, a charging circuit for said sweep condenser comprising two electron discharge devices each having an anode, a cathode and a control element, a source of potential connected in a series circuit including the anode-cathode paths of said two discharge devices, the positive terminal of said source being connected to the anode of said first discharge device, the cathode thereof to the anode of the second discharge device and the cathode of said discharge device through the sweep condenser to the negative terminal of said source, a discharging circuit connected across said condenser, means for applying negative synchronizing pulses to the control element of the second discharge device to block said charging circuit and to allow said condenser to discharge, a potential divider circuit between the terminals of said source, and means for connecting an inner terminal of said potential divider circuit to ground.

WILBUR L. GAINES.

REFERENCES CITED

The following references are of record in the file of this patent:

UNITED STATES PATENTS

| Number | Name | Date |
|---|---|---|
| 2,105,902 | Cawein | Jan. 18, 1938 |
| 2,241,256 | Gould | May 6, 1941 |
| 2,413,063 | Miller | Dec. 24, 1946 |
| 2,423,931 | Etter | July 15, 1947 |
| 2,431,766 | Miller et al. | Dec. 2, 1947 |
| 2,448,070 | Sunstein | Aug. 31, 1948 |